United States Patent Office 3,698,885
Patented Oct. 17, 1972

---

3,698,885
PROCESS FOR PRODUCING SLOW-ACTING POTASSIUM PHOSPHATE FERTILIZERS
Masao Hamamoto and Seiichi Kamo, Tokyo, and Kiyoshi Nakayama, Yokohama, Japan, assignors to Mitsubishi Chemical Industries Limited
Filed Apr. 22, 1970, Ser. No. 30,929
Claims priority, application Japan, Apr. 24, 1969, 44/31,651
Int. Cl. C05b *13/00;* C05d *9/02*
U.S. Cl. 71—1                14 Claims

ABSTRACT OF THE DISCLOSURE

A mixture of phosphate rock, caustic potash and phosphoric acid is calcined. The phosphate rock, caustic potash and phosphoric acid are preferably present in the molar proportion of 1.0:1.7–3.7:1.2–2.0 calculated as $$P_2O_5:CaO:K_2O$$

Figure 1:
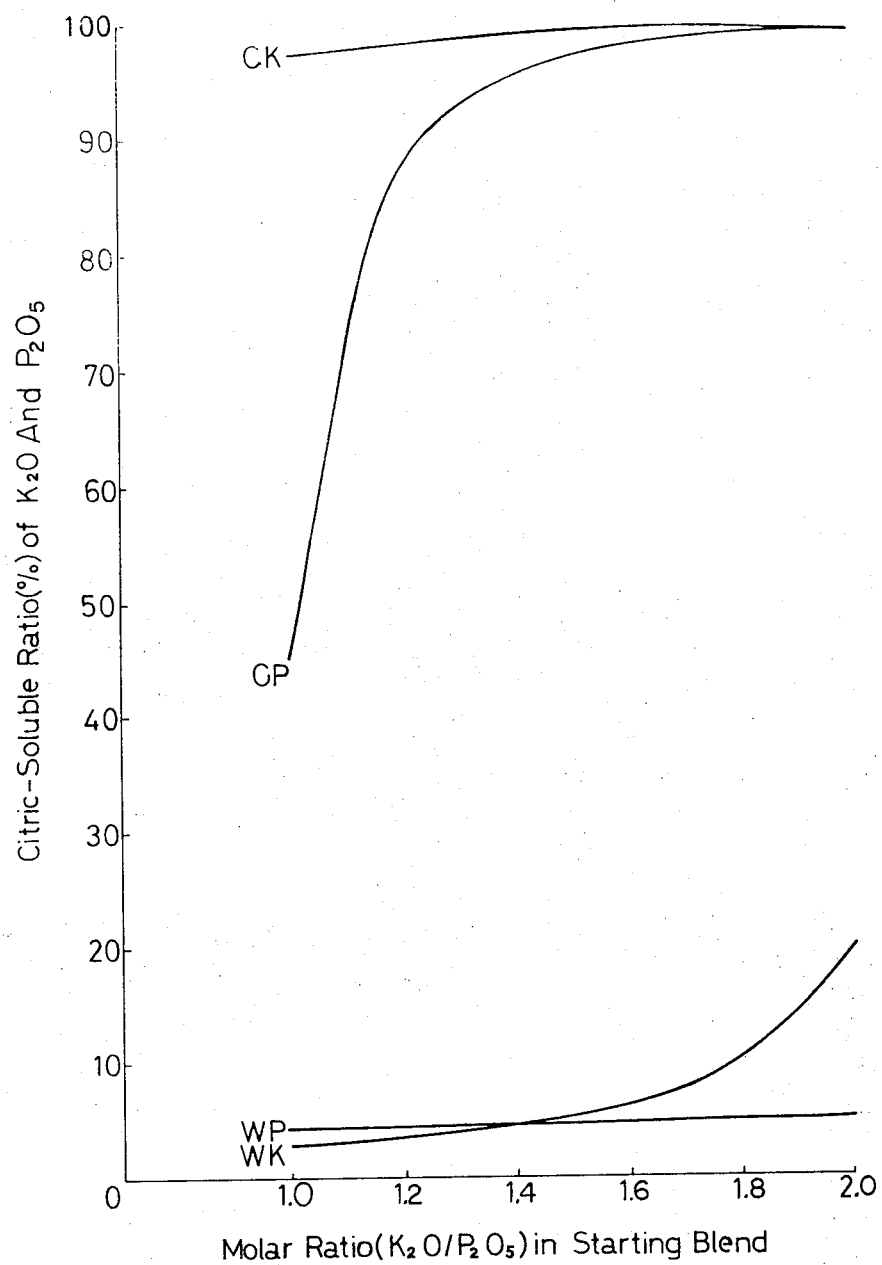

respective. The mixture may also contain a boron-containing compound and/or a magnesium-containing compound.

---

This invention relates to a process for producing slow-acting potassium phosphate fertilizers. More particularly, the invention pertains to an improvement in a process for producing slow-acting potassium Rhenania phosphate fertilizers by calcining phosphate rock together with a potassium compound.

Heretofore, there have been known processes for producing slow-acting potassium phosphate fertilizers by calcining phosphate rock together with such a potassium salt as potassium sulfate, potassium bisulfate, potassium chloride or the like in the presence of steam at a high temperature above about 1,200° C. However, the fertilizers obtained according to the above processes cannot be said to be satisfactory as slow-acting potassium phosphate fertilizers, because the potassium component tends to volatilize during the calcination so that the resulting fertilizers are extremely low in content of potassium component and, in addition, are low in content of citric-soluble potassium component. Further, the fertilizers according to the above processes are strongly alkaline so that they are not desirable for the growth and germination of plants and bring about adverse effects when used in admixture with other fertilizer components. Moreover, according to the said processes, phosphate rock is thermally decomposed together with a potassium salt such as potassium sulfate, potassium bisulfate or potassium chloride, and therefore sulfur dioxide, hydrogen sulfide, hydrogen chloride and the like injuries gases are generated to cause the corrosion of equipments and the problem of public hindrance.

An object of the present invention is to provide an economically and industrially advantageous process for producing slow-acting potassium phosphate fertilizers, which have been made rich in citric soluble potassium compound and in phosphoric acid content by minimizing the volatilization loss of potassium component.

Another object of the invention is to provide a process for producing slow-acting potassium phosphate fertilizers, which have been made so low in alkalinity as not to be injurious for the growth and germination of plants.

A further object of the invention is to provide a process for producing slow-acting potassium phosphate fertilizers according to which process no injurious gas is generated during the calcination of phosphate rock to make it possible to prevent the corrosion of equipments and the public hindrance.

The above-mentioned objects can be accomplished according to the present invention by calcining phosphate rock together with caustic potash and phosphoric acid.

The present invention is explained in detail below.

As the phosphate rock employed in the present invention, any of Florida, Christmas, Morocco and Nauru rocks and so on may be used. The phosphate rock is used in the form of a powder. As the phosphoric acid, wet-process phosphoric acid is ordinarily used, but phosphoric acid obtained according to dry-process may also be used. As the caustic potash, any of solid and liquid caustic potash may be used. These starting materials are homogeneously mixed with each other and the blending proportions thereof are controlled in accordance with the present invention.

In the present invention, phosphate rock, caustic potash and phosphoric acid are ordinarily blended in such proportions that the amount of CaO in the phosphate rock and the amount of $K_2O$ in the caustic potash become, respectively, about 1.7 to 3.7 moles and about 1.2 to 2.0 moles per mole of total $P_2O_5$ present in the phosphoric acid and the phosphate rock. Preferably, the starting materials are so blended that molar ratio of the $$P_2O_5:CaO:K_2O$$

is in the range of 1.0:2.0–3.0:1.3–1.7. Further, the phosphoric acid is desirably blended in such a proportion that the amount of $P_2O_5$ in the phosphoric acid becomes about 0.2 to 1.6 moles per mole of $P_2O_5$ in the phosphate rock.

In the present invention, the molar ratio of the starting materials are so controlled as to be within the above-mentioned range, whereby the contents of slow-acting potassium component and slow-acting phosphoric acid component in the product can be greatly increased. That is, if the amount of phosphoric acid is larger, or if the amount of caustic potash is smaller, than in the above-mentioned range, the reaction system comes to have an acidic pH to disturb the decomposition reaction of the phosphate rock with the caustic potash, so that the amount of citric-soluble phosphoric acid in the product is decreased. On the other hand, if the amount of phosphoric acid is smaller, or if the amount of caustic potash is larger, than in the above-mentioned range, the amount of water-soluble potassium increases and therefore a potassium phosphate fertilizer high in slow-acting degree is difficultly obtainable.

In the present invention, the blending molar ratio of the starting materials is controlled as mentioned above to make it possible to produce a slow-acting potassium phosphate fertilizer extremely high in slow-acting degree which has never been obtained heretofore.

The mixture of the above-mentioned starting materials is then calcined in a calcination furnace. For the calcination, an electric furnace is ordinarily used, but a rotary kiln may also be used. In the present invention, the calcination temperature and time are closely related to the amount of phosphoric acid used. If the amount of phosphoric acid is large, the calcination can be accomplished in a short period of time at a relatively low temperature. Ordinarily, however, it is sufficient that the calcination is effected for 20 to 30 minutes at such a temperature as about 800° to 1,100° C., preferably 900° to 1,100° C. Even at a temperature below 800° C., the calcination is possible. In this case, however, there are encountered such drawbacks that the calcination time is made longer to bring about heat loss and, in addition, the citric-soluble ratio of the product is lowered. Further, the calcination may be carried out even at a temperature above 1,100° C., but the adoption of such a high temperature is not economical for the commercial practice of the present process.

In the present invention, the calcination at an extremely low temperature and in a short period of time has been made possible by the use of phosphoric acid. In contrast thereto, in the case where no phosphoric acid is used, like in the conventional process, it is necessary that the calcination be effected at a temperature of at least 1,200° C. for at least 30 minutes. The calcination has great influence on the slow-acting degree of the product, so that if the calcination is insufficient, the citric-soluble ratio of the product is extremely lowered and no desired product of the present invention can be obtained. In the present invention, unlike in the conventional processes in which phosphate rock is thermally decomposed together with a potassium salt such as potassium sulfate, potassium bisulfate or potassium chloride, the generation of sulfur dioxide, hydrogen sulfide, chlorine gas and the like injurious gases is not brought about at all and, moreover, the volatilization of fluorine or the like is scarcely observed. Accordingly, the adoption of the present process is extremely preferable in preventing the public hindrance and the corrosion of equipments. Further, caustic potash has higher activity than any other potassium compound at the time of thermal decomposition of phosphate rock, and therefore the reaction is not required to be promoted by the use of steam or the like.

When a boron-containing compound is made present in calcining the above-mentioned starting blend according to the present process, it becomes possible to terminate the reaction more quickly and to carry out the calcination at a lower temperature. That is, it becomes sufficient that the starting blend is calcined for 20 to 30 minutes ordinarily at 700° to 1,100° C., preferably at about 750° to 900° C., with the result that the volatilization loss of effective potassium component at the time of calcination can further be decreased. Moreover, the boron-containing compound not only makes citric-soluble the phosphoric acid component in the phosphate rock and the potassium component in the caustic potash but also becomes citric-soluble by itself, and hence is effective as a slow-acting fertilizer component. The kind of the boron-containing compound is not particularly limited. Ordinarily, however, it is economically advantageous to use borax ($Na_2B_4O_7.10H_2O$) or boric acid ($H_3BO_4$) which is most easily obtainable. The decomposition ratio of phosphate rock increases with increasing amount of the boron-containing compound added and reaches maximum when the amount of $B_2O_3$ in the product becomes about 1.5% by weight. On the other hand, the water solubility of boron initiates to increase when the amount of $B_2O_3$ in the product becomes about 2.5% by weight, and 35% of the whole $B_2O_3$ becomes water-soluble when the amount thereof is 3.0% by weight. When the amount thereof becomes more than 5.0% by weight, the calcination product initiates to sinter, whereby the calcination operation becomes difficult and the phosphate rock becomes difficultly decomposable. In view of the above, the amount of the boron-containing compound calculated for $B_2O_3$ is 0.1 to 5.0% by weight, preferably 0.5 to 2.5% by weight, based on the whole weight of the product after calcination.

When the calcination of a blend comprising phosphate rock, caustic potash and phosphoric acid with or without the boron-containing compound is effected in the additional presence of a magnesium-containing compound, the elution rate into soil of the potassium component in the potassium phosphate fertilizer obtained according to the present process can abe further lowered. The main component of the potassium phosphate fertilizer obtained according to the present process is K-rhenanite ($CaKPO_4$), which has such a markedly low water-solubility as, for example, 0.1–0.2 $K_2O$ g./100 ml. $H_2O$ at 30° C. It is therefore considered that the present fertilizer is satisfactory as a slow-acting fertilizer. However, when the fertilizer is actually applied to soil, the elution rate into soil of the potassium component thereof is unexpectedly high. This phenomenon is particularly marked when pasture and the like is cultivated for a long period of time in volcanic ash soil, into which the potassium component tends to escape. However, this drawback can be easily overcome by adding a magnesium-containing compound to the system at the time of calcination. Examples of the magnesium-containing compound include serpentine ($3MgO.2SiO_2$), forsterite ($2MgO.SiO_2$), enstatite ($MgO.SiO_2$), dunite [$(SiO_2)_{0.7}(MgO)_{1.15}$], talc $$(3MgO.4SiO_2.H_2O)$$

periodotite [$(Mg.Fe)_2SiO_4$], dolomite ($CaCO_3.MgCO_3$), magnesite ($MgCO_3$), brucite [$Mg(OH)_2$], magnesium sulfate, magnesium chloride, magnesium nitrate, magnesium phosphate and the like. The magnesium-containing compound is added in such an amount that the proportion of magnesium calculated as MgO becomes 0.05 to 2.5 moles, preferably 0.3 to 0.9 moles per mole of $P_2O_5$ in the starting blend. The MgO-containing compound, e.g. serpentine, reacts during the calcination with caustic potash and phosphoric acid and is thermally decomposed as shown in the following equations:

$$3MgO.2SiO_2+2K_2O \rightarrow 2MgK_2SiO_4+MgO$$

$$3MgO.2SiO_2+4KOH+KH_2PO_4 \rightarrow 2MgK_2SiO_4+MgKPO_4$$

As seen in the above equations, a part of the caustic potash in the starting blend is consumed for the formation of $MgKPO_4$ or $MgK_2SiO_{44}$, and therefore the rate of decomposition of phosphate rock with the caustic potash sometimes lowers. In such a case, it is desirable that the amount of caustic potash required for the formation of $MgKPO_4$ or $MgK_2SiO_4$ is increased to a suitable extent.

It is inferred that the quick elution into soil of the potassium component in the potassium phosphate fertilizer is ascribable to the fact that ammonium ions or hydrogen ions, which are present abundantly in the soil, tend to bring about a selective substitution reaction with $CaKPO_4$, as shown in the following equations:

$$CaKPO_4+NH_4^+ \rightarrow CaNH_4PO_4+K^+$$

$$CaKPO_4+H^+ \rightarrow CaHPO_4+K^+$$

The reason why the magnesium-containing compound can inhibit the above-mentioned substitution reaction to increase the slow-acting property of the fertilizer in the soil has not yet been clarified in detail. However, in view of the fact that even when the magnesium-containing compound is calcined together with caustic potash, the elution rate of the potassium component in the calcination product does not decrease, it is considered that in the present process, $MgKPO_4$ or $MgK_2SiO_4$ is formed, and the thus formed compound reacts with $CaKPO_4$ to give a solid solution, with the result that the elution rate of the potassium component is lowered.

A potassium phosphate fertilizer obtained in the above-mentioned manner exhibits, in general, such a strong alkalinity as above pH 10 which is derived from the caustic potash used as a starting material. If, in order to lower the alkalinity of the product, the amount of the starting caustic potash is decreased, the decomposition ratio of the phosphate rock lowers, while if the amount of phosphoric acid is increased in place of decreasing the amount of caustic potash, the amount of water-soluble phosphoric acid increases. Alternatively, there is thought of a process in which the product is directly neutralized with an acid or an acid salt. In this case, however, there are such drawbacks that not only the potassium component, which has purposely been brought into a citric-soluble form by calcination, is again made water-soluble, but also the lowering of pH difficulty proceeds.

In the present invention, the starting blend is calcined and then the calcination product which is still at an elevated temperature is directly sprinkled, without being cooled, with an acid or its ammonium salt, thereby effecting the neutralization and cooling of said product at one stage. According to the present invention, therefore, a product, which is so low in alkalinity as not to be injurious to the growth and germination of plants, can be easily obtained without making the potassium component thereof water-soluble. That is, at a position near the outlet of the calcination furnace or near the inlet of the cooler, the neutralization and cooling of the calcination product are simultaneously effected by sprinkling an acid or its ammonium salt to the calcination product while it is still maintained at a high temperature, and then the thus treated product is cooled to normal temperature.

Examples of the acid and its ammonium salt used in the present invention include mineral acids such as phosphoric, sulfuric, nitric and hydrochloric acids, and their ammonium salts such as ammonium sulfate, ammonium phosphate, ammonium nitrate and ammonium chloride. These may be used either singly or in combination of 2 or more. It is desirable to use phosphoric acid or ammonium phosphate which is a fertilizing component. If the concentration of the acid or its ammonium salt used is excessively high, no uniform sprinkling can be effected and the pH of the product difficultly lowers. Conversely, if the concentration thereof is excessively low, a large amount of the acid or its ammonium salt is required to be sprinkled, so that excess water cannot be vaporized completely and the product is obtained in a wet state, with the result that a drying step becomes necessary. It is therefore desirable that the concentration of the acid or its ammonium salt used is within the range from such a concentration as not to bring about non-uniform sprinkling to such a concentration as not to require drying after sprinkling. That is, the concentration is 10 to 70%, preferably 20 to 45%, by weight in the case of phosphoric acid; 10 to 70%, preferably 20 to 50%, by weight in the case of sulfuric acid; 10 to 70%, preferably 25 to 60%, by weight in the case of nitric acid; and 10 to 40%, preferably 25 to 35%, by weight in the case of hydrochloric acid. If any one of their ammonium salts is used, preferably it will be in the form of a saturated solution. The acid or its ammonium salt is added in an amount necessary to neutralize the calcination product. If the amount is unnecessarily large, not only the water-solubilization of the potassium component proceeds but also the drying of the calcination product after neutralization becomes necessary. Generally, the amount of the acid or its ammonium salt used is decided so as to be in conform to the desired pH of the product and the desired water solubilization ratio of the potassium component.

It is desirable that the temperature adopted in neutralizing the calcination product by applying the acid or its ammonium salt thereto is as high as possible. However, the effects of the present invention can be displayed so far as the temperature is at least 100° C. For uniform application of the acid or its ammonium salt, there may be employed any of the ordinary procedures. It is, however, desirable that the application is effected by spraying.

By practicing such acid or its ammonium salt treatment as mentioned above, the alkalinity of the product can be neutralized without making the potassium component water-soluble, i.e. without losing the slow-acting property thereof. The reason therefor has not been clarified yet but is inferred to be as follows:

That is in calcining a blend comprising such starting materials as phosphate rock, caustic potash and phosphoric acid, the caustic potash is consumed, in the interior or on the surface of the calcined particles, in an amount necessary to form rhenanite ($CaKPO_4$), but excess caustic potash lixiviates on the surface of the particles and is fixed as potassium phosphate or potassium carbonate. In evidence thereof, there is such a fact that when the particles of the product are analyzed, more than about ⅔ of the water-soluble $K_2O$ in the product is present in the vicinity of the surface. The pH of the $CaKPO_4$ itself is 8 to 9 and is not strongly alkaline, and therefore the said water-soluble $K_2O$ increases the pH of the product. Accordingly, the pH of the product can be lowered by neutralizing only the $K_2O$ in the vicinity of the surface. When the calcination product is cooled and then neutralized by application of acid or its ammonium salt, the acid penetrates into the interior of the particles and is consumed for the decomposition of $CaKPO_4$. In accordance with the present process, however, the acid or its ammonium salt is sprinkled to the calcination product which is still at a high temperature without being cooled, so that water and sometimes ammonia if the ammonium salt is used are momentaneously vaporized and only the $K_2O$ on the surface can be neutralized. Further, $CaKPO_4$ has two types, α-type and β-type, and the transition temperature thereof is 705° C. At a higher temperature, the amount of the α-type is larger, while at a lower temperature, the amount of the β-type is larger. The α-type is difficultly acid-soluble as compared with the β-type, so that when the neutralization is effected at a lower temperature, the β-type $CaKPO_4$ is decomposed and the slow-acting potassium component is made water-soluble. According to the present process, however, the neutralization is effected at a higher temperature where the amount of the α-type is larger. Since the α-type is difficultly decomposable, only the potassium component present on the surface of the product is neutralized. The above is considered to be the reason for the aforesaid matter.

Thus, in accordance with the present process, the quick termination of reaction and the low temperature calcination have been made possible by making phosphoric acid with or without a boron-containing compound present in the thermal decomposition of phosphate rock with caustic potash. The phosphoric acid reacts with the caustic soda and is fixed as potassium phosphate, and hence can greatly decrease the volatilization loss of the potassium component at the time of calcination. Further, the phosphoric acid not only makes citric-soluble the phosphoric acid component in the phosphate rock and the potassium component in the caustic potash but also becomes citric-soluble by itself. Accordingly, the potassium phosphate fertilizers obtained according to the present invention are rhenania type fertilizers containing large amounts of effective components and have excellent slow-acting property.

Figure 2:
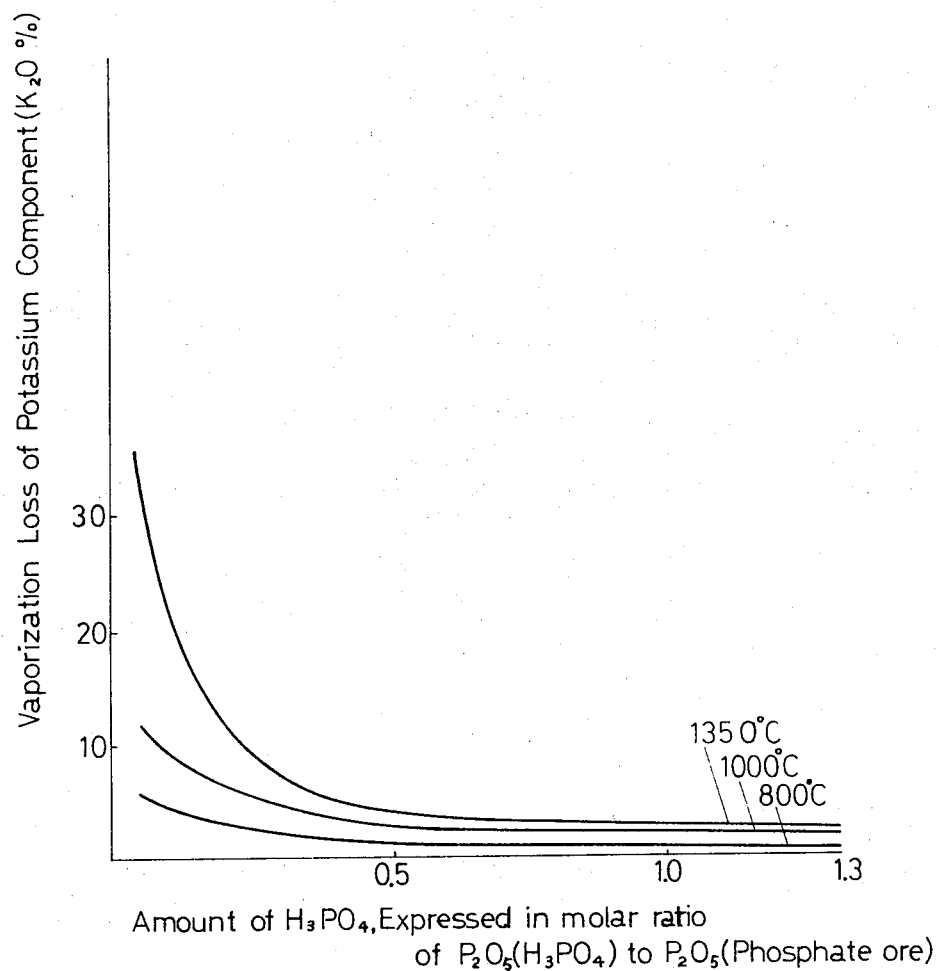
Figure 3:
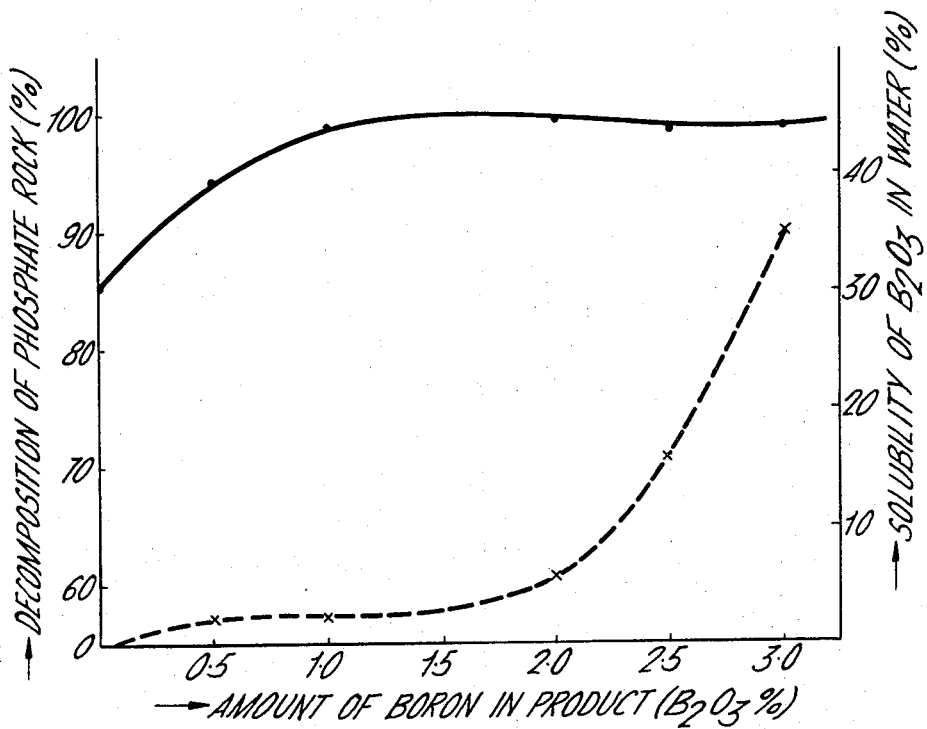
Figure 4:
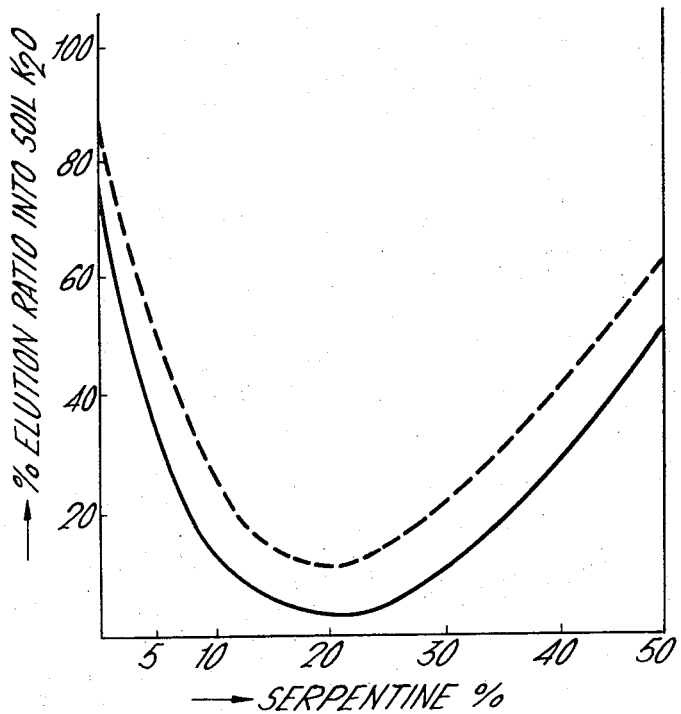

In the accompanying drawing, FIG. 1 shows the relation between the molar ratio of $K_2O:P_2O_5$ and the citric-soluble ratio thereof; FIG. 2 shows the relation between the amount of phosphoric acid used and the amount of volatilization loss of the potassium component at the time of calcination; FIG. 3 shows the relation between the amount of boron used, and the decomposition ratio of phosphate rock and the water-solubilization ratio of boron; and FIG. 4 shows the relation between the amount of serpentine used and the elution rate into soil of the potassium component in the product fertilizer.

From FIG. 1, which shows the relation between the $K_2O:P_2O_5$ molar ratio in the starting blend and the citric-soluble ratio between $K_2O$ and $P_2O_5$ components in the product fertilizer, it is evident that the fertilizer according to the present process is excellent in slow-acting property.

Such a slow-acting potassium phosphate fertilizer containing large amounts of effective components cannot be obtained unless the present process is adopted.

Further, the citric-soluble $P_2O_5$ to citric-soluble $K_2O$ ratio in the present fertilizer can be varied by controlling the blending ratio of the starting materials, as shown in the examples set forth below, and thus slow-acting potassium phosphate fertilizers of various grade can be obtained. These fertilizers are blended with nitrogenous fertilizers comprising urea-aldehyde condensation products, whereby slow-acting fertilizers containing three essential elements can be obtained.

According to the present process, not only no injurious gases are generated during the calcination but also the volatilization of fluorine is scarcely observed, unlike in the conventional processes, so that the adoption of the present process is quite desirable for prevention of the public hindrance and the corrosion of equipments. Moreover, the reaction according to the present process is not required to be promoted by the aid of steam, unlike the reactions according to the conventional processes.

Further, in accordance with the present invention, a magnesium-containing substance is incorporated into the starting blend, with the result that the rate of elution of the poassium component into soil can be more slowed down and the antagonism derived from vigorous potassium absorption into soil at the initial stage can be completely prevented.

Still further, subsequent to the calcination of the starting blend, the calcination product which is still at a high temperature is sprinkled, without being cooled, with an acid or its ammonium salt, thereby effecting the neutralization and cooling of the product at one stage. By such an extremely simple operation as above, a product so low in alkalinity as to give no injury to the growth and germination of plants can be easily obtained without losing the slow-acting property of the product.

The present invention is illustrated in further detail below with reference to examples, but is it needless to say that the invention is not limited to these examples and various modifications are possible within the scope of the invention. In the following examples, all percentages are expressed by weight.

EXAMPLE 1

Florida phosphate rock (46.5% CaO, 31.6% $P_2O_5$, 7.5% $SiO_2$, 3.1% F), wet process phosphoric acid (54% $P_2O_5$) and caustic potash (48% aqueous solution) were blended together so as to attain such molar ratios as shown in the table below. Each of the resulting blends was calcined in a rotary kiln for 30 minutes at such temperatures as set forth in the table. The analysis values of the calcination products were as shown in the following table:

| Molar ration of starting materials | Calcination temperature | Analysis values of product (percent) | | | | | | Citric-soluble ratio (percent) | |
|---|---|---|---|---|---|---|---|---|---|
| $P_2O_5:CaO:K_2O$ | (° C.) | $T-P_2O_5$ | $C-P_2O_5$ | $T-K_2O$ | $C-K_2O$ | $W-K_2O$ | $P_2O_5$ | $K_2O$ | |
| 1.0:2.3:1.8 | 800 | 28.0 | 26.3 | 5.0 | 31.0 | 30.8 | 8.8 | 94.0 | 99.4 |
| 1.0:2.3:1.5 | 950 | 31.0 | 30.0 | 6.3 | 30.5 | 30.0 | 7.2 | 96.7 | 98.3 |
| 1.0:2.2:1.2 | 950 | 35.2 | 33.5 | 2.1 | 27.4 | 27.1 | 4.8 | 95.2 | 98.9 |
| 1.0:3.0:1.5 | 1,000 | 27.9 | 27.2 | 0.7 | 27.6 | 27.5 | 2.0 | 97.2 | 98.6 |
| 1.0:2.4:2.0 | 1,100 | 27.2 | 27.0 | 1.1 | 35.4 | 35.1 | 10.0 | 99.4 | 99.1 |

As is clear from the above table, slow-acting fertilizers having any desirable C—$P_2O_5$ and C—$K_2O$ contents can be obtained by controlling the molar ratios of the starting materials.

EXAMPLE 2

The same starting materials as in Example 1 were blended together so as to attain a molar ratio of $$P_2O_5:CaO:K_2O=1.0:2.3:1.5$$

and the blend was subjected to calcination. The relation between the amount of volatilization loss of the potassium component and the amount of the phosphoric acid used in the above case was as shown in FIG. 2. From FIG. 2, it is understood that the volatilization of the effective potassium component greatly decreases with increasing amount of the phosphoric acid added.

EXAMPLE 3

The same starting materials as in Example 1 were blended together so as to attain a molar ratio of $P_2O_5:CaO:K_2O=1.0:3.0:1.7$. To the blend was added a given amount of borax (15.3% $Na_2O$, 35.5% $B_2O_3$), and the resulting mixture was pulverized and then subjected to calcination at 900° C. for 30 minutes. The decomposition ratio of the phosphate rock (solid line) and the water-solubilization ratio of the boron itself (dotted line) which were observed in the above case are shown in FIG. 3.

EXAMPLE 4

Nauru phosphate rock (38.9% $P_2O_5$, 54.4% CaO, 0.2% $SiO_2$, 2.7% F), caustic potash and phosphoric acid were blended together so as to attain such a molar ratio as shown in the table below. To the blend was added a given amount of boric acid, and the resulting mixture was subjected to calcination in a rotary kiln at 800° C. for 30 minutes. The analysis values of the thus obtained product were as shown in the following table:

| Blending ratio | | Percent | | | | | | | | | Decomposition ratio of phosphate rock, percent | Water-soluble ratio of $K_2O$, percent | Water-soluble ratio of $B_2O_3$, percent |
|---|---|---|---|---|---|---|---|---|---|---|---|---|---|
| $P_2O_5:CaO:K_2O$ | (Percent) | $T-P_2O_5$ | $C-P_2O_5$ | $W-P_2O_5$ | $T-K_2O$ | $C-K_2O$ | $W-K_2O$ | $T-B_2O_3$ | $C-B_2O_3$ | $W-B_2O_3$ | | | |
| 1.0:3.0:1.7 | 0.5 | 29.35 | 28.82 | 0.07 | 33.60 | 33.57 | 2.02 | 0.50 | 0.49 | 0.02 | 98.2 | 6.0 | 4.0 |
| 1.0:3.0:1.7 | 1.0 | 29.30 | 29.30 | 0.03 | 33.52 | 33.52 | 1.84 | 1.01 | 1.00 | 0.03 | 100.0 | 5.5 | 3.0 |
| 1.0:3.0:1.7 | 2.0 | 29.05 | 29.05 | 0.11 | 33.18 | 33.15 | 1.93 | 1.98 | 1.98 | 0.18 | 100.0 | 5.8 | 6.0 |

EXAMPLE 5

Morocco phosphate rock (35.1% $P_2O_5$, 53.0% CaO, 0.9% $SiO_2$, 4.2% F), caustic potash and phosphoric acid were blended together so as to attain a molar ratio of $P_2O_5:CaO:K_2O=1.0:2.4:1.5$. To this blend were added serpentine in a given amount based on the phosphate rock and caustic potash in an amount corresponding to 20% by weight of $K_2O$ based on said serpentine. The resulting mixture was pulverized, granulated and then calcined in an electric furnace at 1,000° C. for 30 minutes to obtain a potassium phosphate fertilizer. The thus obtained fertilizer was tested in elution rate into soil of the potassium component according to incubation method using "Kuroboku" volcanic ash soil. The results were as shown in FIG. 4 (the solid line shows the elution rates measured after one week, and the dotted line shows those measured after 2 weeks).

EXAMPLE 6

Florida phosphate rock (31.6% $P_2O_5$, 46.5% CaO, 7.5% $SiO_2$, 4.2% F), caustic potash and wet process phosphoric acid were blended together so as to attain a ratio of $P_2O_5:CaO:K_2O=1.0:3.0:1.4$ and a ratio of $P_2O_5$ in the phosphoric acid: $P_2O_5$ in the phosphate rock=0.35:1. To this blend was added each of the magnesium-containing compounds set forth in the table. Each of the resulting mixtures was pulverized, granulated and then calcined in an electric furnace at 900° C. for 30 minutes. Subsequently, the calcination product was taken out of the furnace and then immediately sprayed, without being cooled, with 10 cc. per 100 g. of the calcination product of phosphoric acid containing 25% of $P_2O_5$. The analysis values of the products were as shown in the following table:

| Mg-containing compound | Added amount based on the phosphate rock (percent) | Percent | | | | | | Decomposition ratio (percent) | Water-soluble ratio of $K_2O$ (percent) | pH |
|---|---|---|---|---|---|---|---|---|---|---|
| | | $T-P_2O_5$ | $C-P_2O_5$ | $W-P_2O_5$ | $T-K_2O$ | $C-K_2O$ | $W-K_2O$ | | | |
| Magnesite | 15.3 | 26.56 | 26.48 | 0.04 | 26.11 | 26.09 | 1.85 | 99.7 | 7.13 | 7.61 |
| Brucite | 11.0 | 26.64 | 26.28 | 0.07 | 26.07 | 26.05 | 2.27 | 98.6 | 8.71 | 7.62 |
| Dolomite | 35.2 | 24.88 | 24.71 | 0.04 | 24.25 | 24.25 | 2.05 | 99.3 | 8.45 | 7.60 |
| Peridotite | 17.8 | 25.13 | 24.86 | 0.12 | 24.52 | 24.48 | 1.79 | 98.9 | 7.31 | 7.60 |
| Enstatite | 19.2 | 24.80 | 24.29 | 0.07 | 24.16 | 24.14 | 2.32 | 97.9 | 9.61 | 7.65 |
| $MgSO_4 \cdot 3H_2O$ | 30.7 | 26.76 | 26.57 | 0.05 | 26.09 | 26.05 | 1.86 | 99.3 | 7.14 | 7.61 |
| $MgCl_2 \cdot 6H_2O$ | 35.8 | 26.82 | 26.41 | 0.02 | 26.14 | 26.13 | 2.50 | 98.5 | 9.57 | 7.68 |
| $Mg(NO_3)_2 \cdot 6H_2O$ | 45.3 | 26.68 | 26.42 | 0.08 | 26.22 | 26.18 | 1.84 | 99.0 | 7.03 | 7.64 |
| $Mg_3(PO_4)_2 \cdot 5H_2O$ | 47.9 | 31.04 | 29.66 | 0.05 | 24.60 | 24.53 | 1.77 | 95.6 | 7.22 | 7.60 |

Further, the products were tested in elution rate into soil of the potassium component according to incubation method using "Kuroboku" volcanic ash soil. The results are shown in the table below together with the results obtained from a control fertilizer containing no such additives as mentioned above.

| Mg-containing compound | Elution rate into soil percent | |
|---|---|---|
| | After one week | After 2 weeks |
| No additive | 78.5 | 87.0 |
| Magnesite | 13.5 | 15.0 |
| Brucite | 13.8 | 18.5 |
| Dolomite | 15.2 | 17.8 |
| Peridotite | 13.2 | 16.0 |
| Magnesium sulfate | 15.0 | 20.1 |
| Magnesium chloride | 16.3 | 21.3 |
| Magnesium nitrate | 16.0 | 24.1 |
| Magnesium phosphate | 14.7 | 20.7 |

EXAMPLE 7

Florida phosphate rock, caustic potash, wet process phosphoric acid and serpentine (38.4% $SiO_2$, 1.8% $Al_2O_3$, 8.0% $Fe_2O_3$, 38.2% MgO) were used to prepare the following blends A and B:

A: The phosphate rock, phosphoric acid and caustic potash were mixed together so as to attain a molar ratio of $P_2O_5:CaO:K_2O=1.0:3.0:1.4$ and a ratio of $P_2O_5$ in the phosphoric acid: $P_2O_5$ in the phosphate rock = 0.29:1.0.

B: To the blend A were further added serpentine in an amount of 20% based on the phosphate rock, and caustic potash in an amount corresponding to 20% of $K_2O$ based on said serpentine.

The thus prepared blends A and B were calcined at 1,000° C. for 30 minutes to obtain potassium phosphate fertilizers comprising such components as shown in the following table:

| Blend | Percent | | | | | | Decomposition ratio of phosphate rock (percent) | Water-soluble ratio of $K^2O$ (percent) | MgO (percent) |
|---|---|---|---|---|---|---|---|---|---|
| | $T-P_2O_5$ | $C-P_2O_5$ | $W-P_2O_5$ | $T-K_2O$ | $C-K_2O$ | $W-K_2O$ | | | |
| A | 28.1 | 27.6 | 0.5 | 25.8 | 25.4 | 3.2 | 98.0 | 12.9 | |
| B | 23.8 | 23.5 | 0.02 | 26.4 | 25.9 | 3.3 | 98.8 | 12.5 | 3.9 |

The two potassium phosphate fertilizers were applied to volcanic ash soil and subjected to response test using sweet sorgo. Cultivation was carried out in a triplicate system with a ridge width of 65 cm. and a sowed amount of 500 g./a. The conditions of fertilizer application were as set forth in the following table:

As the Mg-component was used magnesium sulfate but, in the case of B, the MgO used was only that contained in the product itself.

The times of application of the additional fertilizers were such that the first additional fertilizer was applied after the first crop, the second at the 6–7 leaves stage, the third after the second crop and the fourth at the 6–7 leaves stage.

The yields obtained were as shown in the following table:

| Fertilizer | First cutting (kg./a.) | Second cutting (kg./a.) | Third cutting (kg./a.) | Total (kg./a.) | Index |
|---|---|---|---|---|---|
| A plus urea | 341 | 601 | 223 | 1,165 | 101 |
| B plus urea | 342 | 625 | 302 | 1,269 | 110 |
| Urea plus calcium phosphate plus potassium phosphate | 347 | 589 | 217 | 1,153 | 100 |

As seen in the table, the potassium fertilizer A, composed mainly of $CaKPO_4$ and containing no serpentine, was substantially identical in yields, when applied once a year, with the standard fertilizer divisionally applied 4 times a year. However, the fertilizer B, which had been inhibited from the elution into soil of the potassium component by the use of serpentine, showed, when applied once a year, a 10% increase in yield as compared with the standard fertilizer and the fertilizer A. Such increase in yield is ascribable to the fact that the poatssium component in the fertilizer had been inhibited from eluting into the soil so that, at the initial stage, the amount of Mg did not become insufficient by virtue of the antagonism derived from K and Mg, and a suitable elution rate of the potassium component could be maintained even at the later stage.

EXAMPLE 8

Christmas phosphate rock (39.5% $P_2O_5$, 53.0% CaO, 0.6% $SiO_2$, 1.4% F.), caustic potash, phosphoric acid and forsterite (42.2% MgO, 40.2% $SiO_2$, 1.5% $Al_2O_3$, 7.6% $Fe_2O_3$) were blended together so as to attain a molar ratio of $P_2O:CaO:K_2O=1.0:3.0:1.7$ and 1.0:2.2:1.5 and to contain the foresterite in an amount of 20% by weight based on the phosphate rock. To this

| Fertilizer | Base fertilizer | | | | First additional fertilizer | | Second additional fertilizer | | Third additional fertilizer | | Fourth additional fertilizer | | Total amount of additional fertilizer | |
|---|---|---|---|---|---|---|---|---|---|---|---|---|---|---|
| | N | $P_2O_5$ | $K_2O$ | MgO | N | $K_2O$ | N | $K_2O$ | N | $K_2O$ | N | $K_2O$ | N | $K_2O$ |
| A plus urea | 1.5 | 4.9 | 4.5 | 0.6 | 1.0 | | 0.5 | | 1.0 | | 0.5 | | 3.0 | |
| B plus urea | 1.5 | 4.1 | 4.5 | 0.6 | 1.0 | | 0.5 | | 1.0 | | 0.5 | | 3.0 | |
| Urea plus calcium phosphate plus potassium sulfate | 1.5 | 4.5 | 1.5 | 0.6 | 1.0 | 1.5 | 0.5 | | 1.0 | 1.5 | 0.5 | | 3.0 | 3.0 | blend was further added borax (15.3% $Na_2O$, 35.5% $B_2O_3$) so that the amount of $B_2O_3$ in the product became 1.0%. The resulting mixture was pulverized and then calcined in a rotary kiln at 900° C. for 30 minutes. The calcination product was immediately sprayed, without being cooled, with 10 cc. per 100 g. of the calcination product of phosphoric acid containing 25% of $P_2O_5$, and was then cooled. The analysis values of the thus obtained product were as shown in the following table:

and a ratio of $P_2O_5$ in the phosphate rock: $P_2O_5$ in the phosphoric acid=1:0.63. This blend was granulated and then calcined at 1,000 C. for 30 minutes. The calcination product was neutralized by being sprayed with 25% sulfuric acid both at a high temperature while rotating the calcination product at 1,000° C. without cooling and

| Blending ratio $P_2O_5$:CaO:$K_2O$ | Analysis values of the product (percent) | | | | | | | | | | | |
|---|---|---|---|---|---|---|---|---|---|---|---|---|
| | T-$P_2O_5$ | C-$P_2O_5$ | W-$P_2O_5$ | T-$K_2O$ | C-$K_2O$ | W-$K_2O$ | T-$B_2O_3$ | C-$B_2O_3$ | W-$B_2O_3$ | Citric-soluble ratio of $P_2O_5$ | Water-soluble ratio of $K_2O$ | Volatilization ratio of $K_2O$ |
| 1.0:3.0:1.7 | 26.94 | 26.78 | 3.05 | 30.17 | 30.17 | 1.75 | 1.02 | 1.02 | 0.05 | 99.4 | 5.8 | 0.0 |
| 1.0:2.2:1.5 | 31.73 | 31.63 | 3.44 | 31.08 | 31.05 | 2.05 | 1.03 | 1.02 | 0.03 | 99.7 | 6.6 | 0.0 |

Fertilizer response test

The potassium phosphate fertilizer obtained in the above by blending the above-mentioned components so as to attain a ratio of $P_2O_5$:CaO:$K_2O$=1.0:3.0:1.7 was subjected to fertilizer response test under the following conditions:

Conditions

Soil: Volcanic ash soil.
Crops: Japanese cedar and Japanese red pine at the two-years stage.
Time: 2 years.
Place: Seedling field, 50 seedlings per area, triplicate system.
Fertilizer:
(A) Ammonium potassium phosphate
(N:$P_2O_5$:$K_2O$=14.0:10.5:13.6)
(B) Isobutylidenediurea plus fertilizer of the present invention (N:$P_2O_5$:$K_2O$=14.8:10.6:13.5).
Amount of fertilizer applied: Each fertilizer was applied once a year so that the amount of N became 15 g./seedling, the amount of $P_2O_5$ 11 g./seedling, and the amount of $K_2O$ 14 g./seedling.

The results were as shown in the following table:

after cooling to normal temperature. The results were as shown in the following table:

| Neutralization process | 25% $H_2SO_4$ sprayed, cc./10 g. sample | pH [1] | Water-soluble ratio of $K_2O$, percent [2] |
|---|---|---|---|
| Low temperature neutralization with spraying | 0 | 11.0 | 8.4 |
| | 3 | 10.0 | 69.0 |
| | 5 | 9.1 | 78.5 |
| | 8 | 7.1 | 84.5 |
| | 10 | 6.5 | 89.0 |
| | 12 | 6.1 | 90.0 |
| High temperature neutralization with spraying (present process) | 0 | 11.0 | 8.4 |
| | 1 | 8.2 | 10.5 |
| | 2 | 7.7 | 14.7 |
| | 3 | 7.3 | 18.2 |
| | 4 | 7.0 | 23.5 |
| | 6 | 6.7 | 35.5 |

[1] Measured in the solution of 1 g. sample in 100 cc. of water.
[2] $\frac{\text{Water-soluble } K_2O}{\text{Citric-soluble } K_2O} \times 100$ As is clear from the above table, in case the calcination product is neutralized after cooling, the water-soluble ratio of $K_2O$ quickly increases with decreasing pH, whereby the slow-acting property of the product is lost. Further, in this case, the product after neutralization is in a wet state and hence should be subjected to drying. On the other hand, in case the calcination product is

| Crop | Fertilizer | Increase in height after 1 year (cm.) | Index | Increase in height after 2 years (cm.) | Index | Root diameter after 2 years (cm.) | Index |
|---|---|---|---|---|---|---|---|
| Cedar | A | 57.5 | 100.0 | 71.8 | 100.0 | 22.5 | 100.0 |
| | B | 60.8 | 105.7 | 77.7 | 108.2 | 24.5 | 108.9 |
| Red pine | A | 21.0 | 100.0 | 46.4 | 100.0 | 20.4 | 100.0 |
| | B | 22.1 | 105.2 | 52.8 | 113.8 | 22.3 | 109.3 |

EXAMPLE 9

Florida phosphate rock (31.6% $P_2O_5$, 46.5% CaO, 7.8% $SiO_2$, 3.1% F), wet process phosphoric acid (54% $P_2O_5$) and caustic potash (48% aqueous solution) were blended together so as to attain a ratio of $P_2O_5$:CaO:$K_2O$=1.0:2.3:1.5 neutralized by high temperature acid-spraying in accordance with the present process, the pH of the product lowers even when the amount of acid is smaller than that in the case where the product is neutralized after cooling. Further, the water-solubilization of $K_2O$ does not proceed, and the slow-acting property of the product can sufficiently been maintained. According to the present process, the water in 25% sulfuric acid is completely vaporized so far as the amount of the acid is up to 5 to 6 cc./10 g., and no drying of the product is necessary.

In this example, the low temperature neutralization process did not substantially differ in citric-soluble ratio of $P_2O_5$ from the high temperature neutralization process according to the present invention, and both processes gave citric-soluble ratios of $P_2O_5$ of 95% and more.

EXAMPLE 10

The same starting materials as in Example 9 were blended together so as to attain a ratio of $$P_2O_5:CaO:K_2O = 1.0:2.77:1.29$$

and a ratio of $P_2O_5$ in the phosphate rock: $P_2O_5$ in the phosphoric acid = 1:0.35. To this blend was added 15% by weight based on the phosphate rock of a 50:50 mixture of dunite (41.1% $SiO_2$, 46.6% MgO) and talc (63.4% $SiO_2$, 30.6% MgO). The resulting mixture was pulverized, granulated and then calcined in an electric furnace at 900° C. for 1 hour. The calcination product was taken out of the furnace and then immediately sprayed, without being cooled, with 30% nitric acid in an amount of 10 cc. per 100 g. of the calcination product.

For comparison, two control products were prepared in such manners that the same mixture as above was calcined and the calcination product was cooled to normal temperature and then subjected to the same neutralization treatment as above, and that a powder of said calcination product was suspended in 30% nitric acid to effect neutralization.

The analysis values of these products were as shown in the following table:

| Process | Analysis values of product (percent) | | | | | | | | | |
|---|---|---|---|---|---|---|---|---|---|---|
| | T-$P_2O_5$ | C-$P_2O_5$ | W-$P_2O_5$ | T-$K_2O$ | C-$K_2O$ | W-$K_2O$ | Citric-soluble ratio of $P_2O_5$ | Citric-soluble ratio of $K_2O$ | Water-soluble ratio of $K_2O$ | pH |
| Present invention | 27.30 | 26.54 | 0.18 | 23.14 | 23.02 | 2.31 | 97.2 | 99.5 | 10.0 | 7.60 |
| Low temperature neutralization process | 27.27 | 25.72 | 2.46 | 22.63 | 22.56 | 8.67 | 94.3 | 99.7 | 38.3 | 10.15 |
| Low temperature neutralization process including suspension step | 27.27 | 37.70 | 4.20 | 22.57 | 22.57 | 20.86 | 94.2 | 100.0 | 92.4 | 7.60 |

EXAMPLE 11

The same starting materials as in Example 9 were blended together so as to attain a ratio of $$P_2O_5:CaO:K_2O = 1.00:2.97:1.44$$

To this blend was added boric acid so that the amount of $B_2O_3$ in the mixture after calcination became 1.5%. Subsequently, the mixture was granulated and then calcined in an electric furnace at 800° C. for 1 hour. The calcination product was taken out of the furnace and then sprayed with 10 cc. of 30% hydrochloric acid per 100 g. of the calcination product to effect the neutralization and cooling of the calcination product. The thus obtained product was not required to be re-dried, and the water content thereof had completely been vaporized during the above treatment. In 100 cc. of water, 1 g. of this product showed a pH of 8.50, whereas a control sample prepared in the same manner as above, except that the neutalization with said hydrochloric acid solution was not effected, showed a pH of 10.15.

EXAMPLE 12

The same starting materials as in Example 9 were blended together so as to attain a ratio of $$P_2O_5:CaO:K_2O = 1.0:3.0:1.4$$

This blend was granulated to 2-4 m./m. in diameter and then calcined at 900° C. for 30 minutes. The calcination product was immediately sprayed, without being cooled, with the ammonium salt solutions set forth in the table. The results were shown in the following table:

| Aqueous ammonium salt solution | Spraying ratio | Water soluble ratio of $K_2O$, percent | pH |
|---|---|---|---|
| 42% ammonium sulfate | 100 cc./1,000 g. product | 8.2 | 7.30 |
| 36.6% ammonium phosphate | do | 8.6 | 7.72 |
| 28.5% ammonium chloride | do | 8.5 | 7.65 |
| 65.8% ammonium nitrate | do | 8.0 | 7.51 |

We claim:

1. A process for producing slow-acting potassium phosphate fertilizers, which comprises calcining phosphate rock together with caustic potash and phosphoric acid, the molar ratio of $P_2O_5$ in said phosphoric acid to that in said phosphate rock being adjusted to 0.2–1.6:1.0 and these starting materials being used at the molar proportions of 1.0:1.7–3.7:1.2–2.0, calculated as $P_2O_5:CaO:K_2O$, respectively.

2. A process as claimed in claim 1 further including the step of adding to the calcined product, while it is at a temperature above 100° C., an acid or a solution of an ammonium salt of said acid to simultaneously effect neutralization and cooling of the calcined product.

3. A process as claimed in claim 1, wherein the materials to be calcinated further includes a boron-containing compound.

4. A process as claimed in claim 3, wherein the boron-containing compound is at least one member selected from borax and boric acid.

5. A process as claimed in claim 3, wherein the boron-containing compound is used in an amount to provide 0.1–5.0% by weight of $B_2O_3$ in the calcined product.

6. A process as claimed in claim 1, wherein the materials to be calcined further includes a magnesium-containing compound.

7. A process as claimed in claim 6, wherein the magnesium-containing compound used is at least one member selected from serpentine, forsterite, dunite, talc, enstatite, periodtite, dolomite, magnesite, brucite, magnesium sulfate, magnesium chloride, magnesium nitrate and magnesium phosphate.

8. A process as claimed in claim 6, wherein the magnesium-containing compound is used in an amount to provide 0.05–2.5 moles of MgO per mole of $P_2O_5$ present in the materials to be calcined.

9. A process as claimed in claim 1, wherein the materials to be calcined further includes a boron-containing compound and a magnesium-containing compound.

10. A process as claimed in claim 9, wherein the boron-containing compound is borax or boric acid or the mixture of both.

11. A process as claimed in claim 9, wherein the magnesium-containing compound used is at least one member selected from serpentine, forsterite, dunite, talc, enstatite, peridodtite, dolomite, magnesite, brucite, magnesium sulfate, magnesium chloride, magnesium nitrate and magnesium phosphate.

12. A process as claimed in claim 9, wherein the boron-containing compound is used in an amount to provide 0.1–5.0% by weight of $B_2O_3$ in the calcined product.

13. A process as claimed in claim 9, wherein the magnesium-containing compound is used in an amount to provide 0.05–2.5 moles of MgO per mole of $P_2O_5$ present in the materials to be calcined.

14. A process as claimed in claim 1, wherein calcination is effected at a temperature of 700° C. to 1100° C.

References Cited

UNITED STATES PATENTS

| | | | |
|---|---|---|---|
| 3,364,008 | 1/1968 | Hollingworth et al. | 71—41 |
| 3,206,298 | 9/1965 | Smalter | 71—1 X |
| 3,291,594 | 12/1966 | Nickerson | 71—47 X |
| 3,010,818 | 11/1961 | Jones et al. | 71—41 X |
| 1,251,742 | 1/1918 | Blumenberg | 71—44 X |
| 931,846 | 8/1909 | Connor | 71—46 |
| 3,189,433 | 6/1965 | Hollingsworth et al. | 71—44 |
| 2,348,343 | 5/1944 | Holbrook et al. | 71—41 X |
| 2,912,317 | 11/1959 | Gloss | 71—46 X |
| 1,823,849 | 9/1931 | Roth et al. | 71—47 X |
| 1,194,219 | 8/1916 | Newberg et al. | 71—47 X |
| 3,552,944 | 1/1971 | Hauschild et al. | 71—45 X |

FOREIGN PATENTS

| | | | |
|---|---|---|---|
| 467,075 | 1937 | Great Britain | 71—46 |

REUBEN FRIEDMAN, Primary Examiner

R. BARNES, Assistant Examiner

U.S. Cl. X.R.

71—41, 46, 47